United States Patent
Duggirala

(10) Patent No.: US 7,617,303 B2
(45) Date of Patent: Nov. 10, 2009

(54) SYSTEMS AND METHOD FOR OPTIMIZING ACCESS PROVISIONING AND CAPACITY PLANNING IN IP NETWORKS

(75) Inventor: Somayajulu Duggirala, Laurence Harbor, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1338 days.

(21) Appl. No.: 10/832,885

(22) Filed: Apr. 27, 2004

(65) Prior Publication Data

US 2005/0240466 A1 Oct. 27, 2005

(51) Int. Cl.
*G06F 15/173* (2006.01)
*G06F 17/30* (2006.01)

(52) U.S. Cl. ............... 709/223; 709/219; 709/224; 709/225; 709/227; 703/2; 703/13; 703/21; 703/22; 703/23; 703/24; 705/10; 379/9; 379/16; 379/17; 379/33; 379/111; 379/269

(58) Field of Classification Search .......... 709/219, 709/223, 224, 225, 227; 703/2, 13, 21, 22, 703/23, 24; 705/10; 379/9–10, 15–17, 33–34, 379/111–113, 220, 269, 374
See application file for complete search history.

(56) References Cited

U.S. PATENT DOCUMENTS

| | | | | |
|---|---|---|---|---|
| 5,678,004 A | * | 10/1997 | Thaweethai | 726/2 |
| 5,764,736 A | | 6/1998 | Shachar et al. | |
| 5,937,042 A | * | 8/1999 | Sofman | 379/112.05 |
| 6,230,200 B1 | * | 5/2001 | Forecast et al. | 709/226 |
| 6,384,833 B1 | | 5/2002 | Denneau et al. | |
| 6,446,123 B1 | | 9/2002 | Ballantine et al. | |

(Continued)

FOREIGN PATENT DOCUMENTS

EP 1 065 827 A 1/2001

(Continued)

OTHER PUBLICATIONS

J. Abley ISC B Black Layer8 Networks, V. Gill, AOL Time Warner; "Goals for IPv6 Site-Multihoming Architectures." *Internet Engineering Task Force*. (2003) vol. 6, No. 7: ISSN 0000-0004, (2003).

*Primary Examiner*—John Follansbee
*Assistant Examiner*—Saket K Daftuar
(74) *Attorney, Agent, or Firm*—Hoffmann & Baron, LLP

(57) ABSTRACT

The present invention provides a method for avoiding demand forecast errors in a network topology model having a plurality of nodes, by monitoring and controlling the quantity of a selected port type at a node. The method comprises determining the actual quantity of a selected port type at a node, setting a forecast of the quantity of the port required, setting a forecast period for the ports, wherein the forecast period is a function of the time required to change the quantity of the ports, and setting a threshold value to generate alerts, wherein the threshold value is a function of the forecast period; monitoring the node for a forecast change, if a forecast change is found then computing the difference between the actual quantity and the forecast quantity, wherein if the difference is greater than the threshold value, then generating an alert and forwarding the alert to a user.

9 Claims, 1 Drawing Sheet

U.S. PATENT DOCUMENTS

| | | | |
|---|---|---|---|
| 6,574,587 | B2 | 6/2003 | Waclawski |
| 6,611,726 | B1 | 8/2003 | Crosswhite |
| 6,640,278 | B1 * | 10/2003 | Nolan et al. ............... 711/6 |
| 6,647,415 | B1 * | 11/2003 | Olarig et al. ............. 709/224 |
| 6,661,788 | B2 | 12/2003 | Angle et al. |
| 6,738,625 | B1 | 5/2004 | Oom et al. |
| 6,744,866 | B1 * | 6/2004 | Nolting et al. ............ 379/133 |
| 6,763,442 | B2 * | 7/2004 | Arakawa et al. .......... 711/165 |
| 6,769,054 | B1 * | 7/2004 | Sahin et al. ............... 711/162 |
| 6,968,355 | B2 * | 11/2005 | Baldwin et al. ........... 709/201 |
| 6,986,139 | B1 * | 1/2006 | Kubo ......................... 718/105 |
| 7,002,963 | B1 * | 2/2006 | Buyukkoc et al. ........ 370/395.1 |
| 7,027,574 | B2 * | 4/2006 | Nolting .................... 379/134 |
| 7,076,036 | B1 * | 7/2006 | Johnson ................. 379/112.06 |
| 7,076,393 | B2 * | 7/2006 | Ormazabal et al. ........ 702/122 |
| 7,213,113 | B2 * | 5/2007 | Sahin et al. ............... 711/162 |
| 7,356,452 | B1 * | 4/2008 | Naamad et al. ............. 703/22 |
| 7,392,360 | B1 * | 6/2008 | Aharoni et al. ............ 711/170 |
| 7,467,193 | B2 * | 12/2008 | Cerami et al. ............. 709/223 |
| 2003/0079018 | A1 * | 4/2003 | Lolayekar et al. ......... 709/226 |
| 2003/0088671 | A1 | 5/2003 | Klinker et al. |
| 2003/0135609 | A1 * | 7/2003 | Carlson et al. ............. 709/224 |
| 2005/0075842 | A1 * | 4/2005 | Ormazabal et al. ........ 702/188 |
| 2005/0076235 | A1 * | 4/2005 | Ormazabal et al. ........ 713/201 |
| 2005/0177629 | A1 * | 8/2005 | Betge-Brezetz et al. ..... 709/223 |
| 2005/0193231 | A1 * | 9/2005 | Scheuren ..................... 714/5 |

FOREIGN PATENT DOCUMENTS

| | | |
|---|---|---|
| EP | 1 113 620 A | 7/2001 |
| EP | 1 401 146 A | 3/2004 |
| JP | 04114532 | 4/1992 |
| JP | 06006351 | 1/1994 |
| JP | 07231322 | 8/1995 |
| JP | 10229393 | 8/1998 |
| JP | 2002198961 | 7/2002 |
| WO | 0227564 | 4/2002 |
| WO | 03/084133 A | 10/2003 |

* cited by examiner

SYSTEMS AND METHOD FOR OPTIMIZING ACCESS PROVISIONING AND CAPACITY PLANNING IN IP NETWORKS

BACKGROUND OF THE INVENTION

Internet protocol (IP) backbone networks consist of sets of nodes which are connected by high-speed links. These nodes route traffic through the network and also connect the customer premise to the IP network. The cost of access from the customer premise to the node is significant portion of the service cost. This cost is a function of the distance between the customer premise and the node. Ideally, each customer premise is connected to the node nearest to his location, termed "the planned node." Therefore, nodes are typically geographically distributed so that the aggregate access cost from all the customer premises is minimized.

Customers access the network via various different mechanisms, such as private lines, asynchronous transfer modes (ATMs), frame relay service (FRS), gigabit and fast Ethernet, etc. The requested access speeds vary widely within each access mechanism.

To accommodate various access mechanisms and speeds, each node consists of a number of access routers with various types of ports connected to one or two backbone routers, which links the node to backbone routers of other nodes. Each type of port can only be used for the specific access mechanism and speed for which it is designed.

To efficiently operate the network, the quantity of each port type at each node should match customer demand. The determination of the demand is tedious because it must be forecast for each port type independently by a time series forecast. If the demand for a particular port type turns out to be higher than the forecasted value, the demand cannot be accommodated by another port type, even if the node has plenty of excess capacity in other types of ports.

It is difficult to precisely forecast the number of ports of each type at each node. Therefore, provisioning processes usually have mechanisms to deal with the forecast errors. If the planned node does not have capacity, the customer premise is connected to the next nearest node that has the desired port, "the alternate node." Such a connection is termed "a mis-homed connection." If and when the planned node has available capacity, the connection between the alternate node and the customer premise is terminated, and the customer premise is connected to the planned node. Connection to the planned node is termed "re-homing."

However, the mechanism of current provisioning processes has several disadvantages. For example, re-homing is very expensive. Re-homing involves building a circuit from the customer premise to the planned node, going through the test and turn up process, and disconnecting the connection between the customer premise and the alternate node. Typically, a dedicated team needs to focus on finding mis-homed connections, and re-homing customer premises to their planned nodes. Also, mis-homed connections are costly since a customer only pays for the access circuit from his premise to the nearest node. Thus, a company needs to absorb the cost of providing access to a sub-optimal node, i.e. an alternate node.

Another disadvantage of current provisioning processes is that they are prone to cascading effects. That is, when a node gets more customer requests than it can accommodate, the excess demand spills over to a neighboring node. Unless that neighboring node has opposite forecast error, i.e. greater capacity than the demand, a capacity shortage is created at such node, and the excess demand spills over to still other nodes.

A further disadvantage of current provisioning processes is that it increases the exception routes, thereby making the network inefficient. All customers connecting to one router get the address space for their network from the same IP address block. In this way, a router can advertise just one block for all the customer networks. However, in a re-home scenario, a customer connection moves from one node to another but the customer IP address block remains the same. In this scenario, the provisioning system has a choice. It can assign addresses either from the router by which the circuit is getting connected, or from the destination router after the re-home. In either case, exception routes need to be advertised when customer network is connected to the router with different IP address block. Such advertising requires valuable resources.

Accordingly, there remains a need for a method of efficiently utilizing ports capacities in an IP network.

SUMMARY OF THE INVENTION

The present invention is a method and apparatus for avoiding demand forecast errors in a network topology model by continuously monitoring and controlling the port capacity at individual nodes of the model. In effect, the invention changes the strategy from dealing with the forecast errors to proactively planning and correcting such errors. Correction of errors are preferably made before they result in mis-homed customer connections.

In one embodiment, the present invention is a method for avoiding demand forecast errors in a network topology model having a plurality of nodes. In the method, the quantity of a particular type of port at a node is continuously monitored and controlled. The steps of the method follows. The actual quantity of a particular port type at a node is determined. A forecast of the quantity of the port type required at the node is determined for a forecast period. The forecast period is the length of time required to change the quantity of the ports at the node, or a function thereof. In one embodiment, the forecast quantity is calculated based on previous months' data. A threshold value to generate alerts is set. The threshold value is a function of the forecast period. The node is then monitored for any forecast change. If such a change is detected then the difference between the forecast quantity and the actual quantity of ports at the node is calculated. If the difference is greater than the threshold value, then an alert is generated. Preferably, the alert is associated with recipient information, and forwarded to a user, thereby avoiding demand forecast errors.

In another aspect, the present invention includes an article of manufacture for avoiding demand forecast errors in a network topology model wherein the article continuously monitors and controls the quantity of a port at nodes. The article includes a machine readable medium containing one or more programs which when executed implement the methods of the invention.

In further aspect, the invention provides a system for avoiding demand forecast errors in networks wherein the system continuously monitors and controls the quantity of a particular type of port at a node. The system comprises a user interface, an analytical module, an alert engine, and an alert distributor. The system is configured via the user interface. The configuration comprises setting a forecast period for a port type at the nodes of interest, and setting a threshold value to generate alerts. The analytical module monitors the node for a potential forecast change. The alert engine is activated by the analytical module if the module detects a forecast change. When the engine is alerted, the engine computes the difference between the forecast quantity and the actual quantity of ports at the node. If the difference is greater than the threshold value, then the engine generates an alert. The alert distributor receives the alert. The distributor then associates the alert with recipient information and forwards the alert and recipient information to a contact manager module.

In another embodiment, the invention is a method of providing a customer premise which is connected to a planned node that has an unmet demand for a desired port type with that port type by efficiently temporarily connecting the customer premise to an alternate node with the desired type of port, i.e. an optimal alternate node. The optimal alternative node is selected by a method comprising calculating a "total access cost" for each of a plurality of alternate nodes. The "total access cost" is the sum of a "first access cost" and a "second access cost." The node which has one of the lowest "total access costs" is selected as the optimal node. The customer is redirected to the optimal alternate node.

The "first access cost" is calculated for each of a plurality of alternate nodes that are nearby the planned node. The cost is a function of the distance between the customer premise and an alternate node.

The "second access cost" is a function of the probability that the alternate node would not be able to accommodate demand from the customer premise. Preferably, the "second access cost" is determined the method that follows. Several factors are required to be determined in this method. A "time for re-home" is calculated. The "time for re-home" is the forecasted time required for the planned node to be provided with the desired port type. A "probability for spillover" during the "time for re-home" for each alternate node is determined. In order to determine the "probability for spillover," the following factors are determined: the forecasted demand for each alternate node as if the customer premise had been directed to the alternate node, designated as "alternate node with customer"; determining the forecasted demand for each alternate node as if the customer premise had not been directed to the alternate node, designated as "alternate node without customer"; and determining the actual capacity at each alternate node. The "probability for spillover" for each alternate node is calculated by the following formula: {("alternate node with customer") minus (the actual capacity at alternate node)} divided by ("alternate node without customer"). The "cost of spillover" for each alternate node is determined. The "cost of spill-over" is calculated by multiplying the distance between the alternate node and the "spillover alternate node" with the cost per mile. The "second access cost" is the product of the "probability of spill-over" and the "cost of spill-over."

The first and second access costs are added to provide a total access cost for each of the plurality of alternate nodes. The customer is redirected to the alternate node which provides the lowest total access cost.

In another aspect, the present invention includes an article of manufacture for providing a customer premise which is connected to a planned node that has an unmet demand for a desired port type with that port type by efficiently temporarily connecting the customer premise to an alternate node with the desired type of port. The article includes a machine readable medium containing one or more programs which when executed implement the operation.

In another embodiment, the invention is a method for determining whether it is cost effective to re-home a customer, wherein the customer demand was redirected from a planned node to an alternate node. In the method a "cost of re-home" is provided. This cost comprises the cost of directing the customer demand to the planned node and the cost of adding of new ports to the planned node. Also, a "total access cost" is provided for the alternate node to which the customer was redirected. As described above, this cost is the sum of a first access cost, wherein the first access cost is a function of the distance between the customer and the alternate node, and a second access cost, wherein the second access cost is a function of the probability that the alternate node would not be able to accommodate demand from the customer premise. The difference between the "cost of re-home" and the "total access cost" is compared with a re-home threshold value. The re-home threshold value is a monetary value, or a function of a such a value, preferably set by a user. An alert is generated if the comparison indicates that it is cost effective to re-home the customer.

In another aspect, the invention includes an article of manufacture for determining whether it is cost effective to re-home a customer, wherein the customer demand was redirected from a planned node to an alternate node. The article includes a machine readable medium containing one or more programs which when executed implement the operation.

For a better understanding of the present invention, reference is made to the following description, taken in conjunction with the accompanying drawings, and the scope of the invention set forth in the claims.

DETAILED DESCRIPTION OF THE INVENTION

Figure 1:
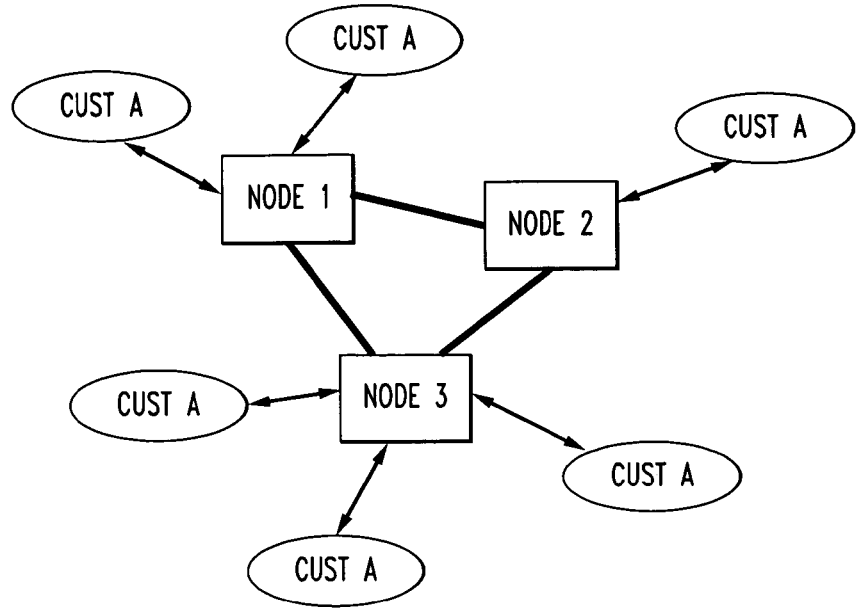
FIG. 1 is a diagram of a Network Map.
Figure 2:
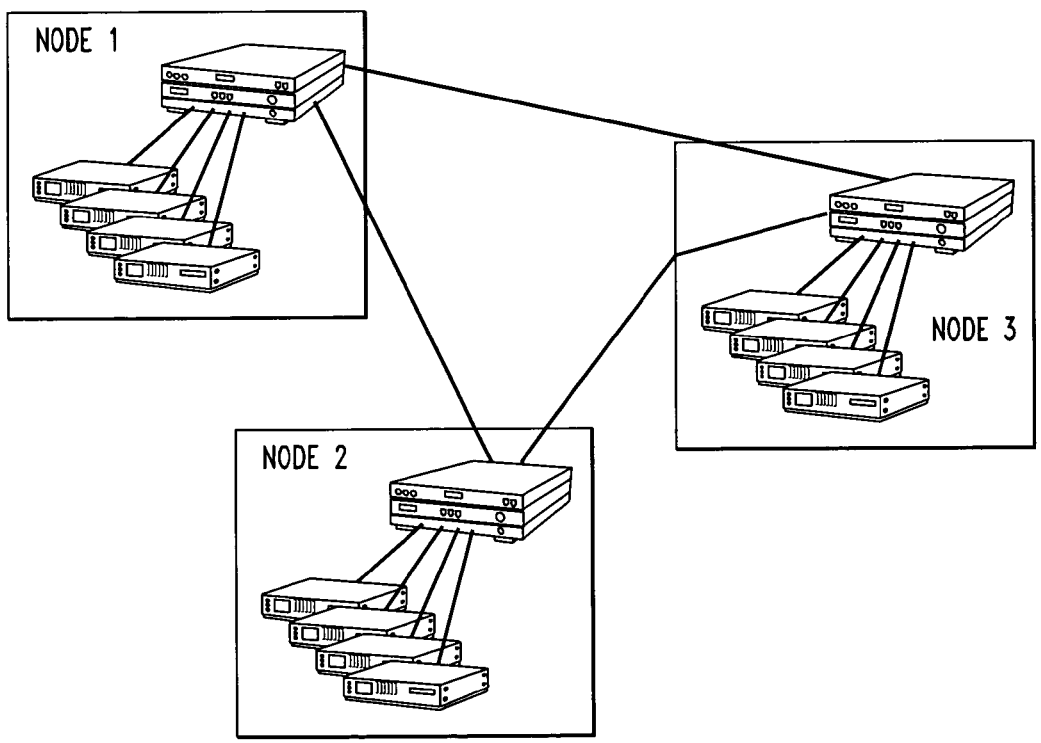
FIG. 2 is a diagram of a Node Detail Map.

The present invention addresses the problem of demand forecast errors in network topology models, such as an internet protocol (IP) backbone networks, by proactively planning and correcting such errors.

Internet protocol (IP) backbone networks comprise sets of nodes which are connected by high-speed links. These nodes route traffic through the network and also act as connection points to the customer premise (i.e. the customer). Customers access the network via various different access mechanisms and speeds. To accommodate various access mechanisms and speeds, each node has a number of access routers with various types of ports connected to one or two backbone routers, which links the node to backbone routers of other nodes.

To efficiently operate a network, the quantity of each port type at each node should equal the customer demand at that node. The quantity of a port type at a node is referred to as the actual capacity (or simply, capacity) of the node for that port type. The circumstance wherein the customer demand does not equal the capacity at the node is referred to as a demand forecast error.

One embodiment of the invention is a method for avoiding demand forecast errors in a network topology model which has a plurality of nodes. In the method, the quantity of a selected port type at individual nodes is continuously monitored and controlled. Preferably, all the nodes of the network are monitored and controlled simultaneously. However, if desired, only particular sets of nodes may be monitored. Users of the invention include, for example, network administrators, network service providers and provisioning tool vendors.

In order to use the invention, relevant parameters are provided by the user, or obtained from a network topology server or database. One of the parameters is the actual capacity of the selected port type at a node of interest. Another parameter is a forecast of the quantity of that port demanded at the node, i.e. the demand forecast or the forecast capacity. The initial demand forecast can be a number which is computed or is set by a user. Preferably, the initial demand forecast is determined from historical data of the demand for the port type at the node, e.g., from the data base of past customer orders. An additional parameter is a forecast period for the ports at the node. The forecast period a function of the length of time required to add new ports to the node. For example, the forecast period can be the length of time required to add new ports to the node.

In this method, a node is monitored for a forecast change for the selected port type. An example of a forecast change is the addition or deletion of customer assignments at the node of interest. Another example of a forecast change is the addition or deletion of a selected port type at the node. If a forecast change is detected, the demand forecast is updated, i.e. recomputed.

The difference between the updated demand forecast at the node and the actual capacity is calculated. In order to simplify the discussion in this specification, the difference is illustrated as the subtraction of the actual capacity from the demand forecast. A skilled artisan would know how to adjust the methods of the invention wherein the difference is calculated as the subtraction of the demand forecast from the actual capacity.

The difference between the demand forecast and the actual capacity determines whether an alert is generated. That is, an alert is generated if the difference between these two parameters is deemed to be at a value which indicates that ports need to be added in order to meet demand at a node within the forecast period.

In particular, the difference between the demand forecast and the actual capacity is compared to a threshold value. The threshold value is a function of the length of the forecast period. For example, if the capacity at the node can be increased quickly, then the threshold value (t) could be set at a relatively high value. That is, a greater difference between the demand forecast and the actual capacity is tolerated. For example, t can be set so that an alert is only sent if the difference is greater than three. Or similarly, an alert is not be sent if the difference is less than four. Thus, for instance, if the demand forecast is set at thirteen and the actual capacity of the port is ten, then the difference (i.e. three) is compared with t. In this case, an alert would not be generated.

On the other hand, if the capacity at the node cannot be increased quickly, then t could be set at a relatively low value. For example, t could be set so that an alert is sent if the difference is greater than zero. Or similarly, an alert is not sent if the difference is less than one. Thus, for instance, if the demand forecast is set at thirteen and the actual capacity of the port is ten, then the difference (i.e. three) is compared with t. In this case, an alert would be generated.

The threshold value can be set by a user. As shown above, the threshold value can specify an upper bound, or specify a lower bound.

Preferably, the alert is associated with reports. Reports can include various types of information. For example, the information can include: a listing of the nodes in the network, the type of the ports at each node, the actual quantity of each type of port at each node, the forecasted quantity of ports at each node, a list of all nodes with T1 capacity for less than a month, and combinations thereof.

The alert and reports are forwarded to the user. The information in such reports can be used to reconfigure topology in order to avoid demand forecast errors. Reconfiguration can comprise adding a port to a low capacity node. For example, port-containing cards can be physically transferred from a node which has a very high excess capacity to a node with unmet demand. Reconfiguration can also comprise transferring customer assignments from a node with unmet demand to a node with excess capacity.

Information obtained from the methods of the invention, i.e. identification of nodes with excess capacity and related information, can be used in other embodiments of the present invention. For example, nodes with excess capacity are good candidates to which excess demand can be directed. Preferably, the information is stored for future reference.

In one embodiment the invention, the method is embodied in a system that comprises an user interface, analytic module, an alert engine, and an alert distributor.

A user interface is the junction between the user and the system. An interface is a set of commands or menus through which a user communicates with the system. The present invention preferably uses a HTML-based user interface. The interface can be command-driven or menu-driven. In a command-driven interface commands are entered by the user. In a menu-driven interface a user selects command choices from various menus displayed on the screen. Preferably, the interface is a graphical user interface.

The interface of the present system enables a user to configure the system. A user can set various parameters here, such as, for example, forecast periods for particular ports at particular nodes, and the various threshold values. The actual capacity of a port type at selected nodes, and their forecast capacities can also be set here. However, if a system has access to inventory and a past order databases, such capacities are preferably calculated by the system.

Preferably, the interface generates reports. Examples of reports are described above. The system can be configured so that users receive reports via their preferred method, such as, for example, e-mail, voice call, pager, etc. Alternatively, the system can continuously place forecast results into a database.

The analytical module monitors nodes for potential forecast changes. Examples of situations that qualify as potential forecast changes are the change of customer assignments at a node, or a change in the capacity at the node, as described above. The analytical module works with the user defined value of the forecast period. The analytic module computes a time series forecast of the number of ports needed for the forecast period. If the analytic module detects a forecast change, the alert engine is activated.

The analytical module is embodied in a software program that computes various analytical functions, such as, for example, time series forecasts. Examples of other functions of an analytical module include computation of regression, variance, T-test etc. Examples of software packages which compute such functions include SAS and SPlus. An analytical module can interface with these modules to calculate these functions.

The alert engine computes the difference between the actual capacity of ports at the node and the forecast capacity, as described above. The engine then compares the difference with the user-defined threshold value. If the difference is greater than the threshold value, then the engine generates an alert, as described above. Preferably, an alert contains the information about, for example, the location of the port, the type of port, and the actual and forecasted capacities of the ports at that location, as described above.

The alert engine is embodied in a software module. The engine uses rules based programming, such as, for example, JESS or Jrules, to make the decisions regarding alerts. However, the rules (i.e. the comparison with the threshold value and the decision of whether to fire an alert) can also be coded in a general purpose programming language such as Java, C or C++.

The alert is then passed to the alert distributor. The distributor associates the alert with recipient information. The distributor can map the alert to a group of recipients via their preferred method of receiving alerts. Mapping can be based on any attribute of the alert. For example, a simple rule could be "send all alerts for node X to A" or "send the alerts with the forecast exceeding the capacity by X % to B and C over phone from 9AM to 5PM and over e-mail from 5PM to 9AM." Methods of receiving the alerts include, for example, e-mail, voice call, pager, etc.

The alert distributor is embodied in a software module in the system. The distributor maintains a list of users and their and their preferred time and mode of notification. These preferences can be set using a graphical user interface. When an alert is forwarded by the alert engine, the distributor finds the users subscribed to such alert and sends the information to the contact manger with their preferences. The contact manager is a system module that formats the communication in the preferred mode.

Once an alert distributor forwards the alert and the recipient information to a user, the user can use the information to make decisions regarding reconfiguration of the network topology. Reconfiguration preferably avoids forecast errors which may result in mis-homed customer connections. For example, recipients of these alerts can either move any excess capacity to the deficient node or order new cards.

Correction of forecast errors are preferably made according to the present invention before they result in mis-homed customer connections. However, sometimes demand at a location can suddenly change due to an unanticipated event. An example of such an event took place after the sudden disclosure of accounting irregularities at WorldCom. Following the disclosure, WorldCom customers sought new carriers which resulted in a sudden increase in demand at various nodes of their competitors, such as AT&T. Time series forecasts of node capacity based solely on historical data did not catch such an unanticipated event. The present invention provides methods to efficiently deal with such unanticipated events.

In one embodiment of the present invention, a method of determining an optimal alternate node, which contains a desired type of port, is provided. In this embodiment, a customer premise, which is connected to a planned node that has an unmet demand for a desired port type, is provided with that port type by efficiently temporarily connecting the customer premise to an alternate node with such port type.

The optimal alternate node is selected by a method comprising assigning a "total access cost" to each of a plurality of nodes within the network topology. The "total access cost" is the sum of a "first access cost" and a "second access cost" for each of the nodes.

A first access cost is assigned to each of a plurality of alternate nodes that are nearby the planned node. The cost is a function of the distance between the customer premise and the alternate node. The first access cost can be calculated by multiplying the physical distance between the customer premise and an alternate node with the appropriate cost per mile in the tariff tables (e.g., tariff 9 and tariff 11). The cost per mile is based on whether the connection is interstate or intrastate, as is known in the art.

Before describing the second access cost, the terminology used in the present specification is clarified. Each node in a network is the planned node for a customer. Accordingly, an alternate node for a first customer is the planned node for a second customer. The planned node for each customer should accommodate the demands of its customer. However, if a first customer is redirected to the planned node of a second customer, then the planned node of the second customer has both the demand of the first customer and the second customer. If the planned node of the second customer cannot accommodate such a demand, the demand would spillover to yet another node, i.e. to the planned node of a third customer. For the purposes of this specification, such a node is termed "spillover node."

A second access cost is assigned to each of the plurality of alternate nodes. The second access cost is based on the probability of not fulfilling a second customer's demand at his planned node due to the first customer being redirected to such node. In other words, the second access cost is based on the probability that the first customer's alternate node may not be able to accommodate all its expected demand.

Several factors need to be provided to determine the second access cost. First, the time period required to reestablish the connection of the first customer back to his planned node, termed "time for re-home," is provided or calculated. This period is the forecasted time required for the planned node to be provided with the desired port type. That is, the "time for re-home" depends on the forecasted availability of the desired port type at the first customer's planned node. Availability depends on when the user is planning to install new ports at the planned node, or when the demand is expected to decrease at the planned node.

Another factor to be provided to determine the second access cost is the "probability of spillover" for each alternate node. The "probability of spillover" is the probability that while the first customer is connected to an alternate node, the demand from this alternate node would spillover to the second customer's alternate node. (In other words, the "probability of spillover" is the probability that the demand from the second customer's planned node would spillover to the "spillover node" during the "time for re-home.") The "probability of spillover" is calculated for the plurality of alternate nodes.

A few factors need to be determined in order to calculate the "probability of spillover" for each alternate node. The forecasted demand for the alternate node has to be determined as if the customer premise had already been directed to the alternate node. That is, the demand forecast at a first customer's alternate node after the first customer has been redirected to the alternate node is determined. This factor is designated as the "alternate node with customer." Also, the forecasted demand for the alternate node has to be determined before the customer premise is directed to the alternate node. This factor is designated as the "alternate node without customer." Additionally, the actual capacity at each alternate node has to be determined.

The "probability for spillover" for each alternate node is then calculated by the following formula:

$$\{(\text{"alternate node with customer"}) \text{ minus (the actual capacity at alternate node)}\} \text{ divided by ("alternate node without customer")}.$$

Another factor to be provided to determine the second access cost is the "cost of spillover" for each alternate node. The "cost of spillover" is calculated by determining the distance between the alternate node and the "spillover node" wherein the "spillover node" is the alternate node of the alternate node. This distance is multiplied by the cost per mile.

The second access cost for each of the plurality of alternate nodes is the product of the "probability of spillover" and the "cost of spillover."

An example follows to illustrate the calculation of the second access cost. Suppose node B is an alternate node for planned node A. Assume that it takes a month to add new ports at A and re-home the connection. Thus, in this case, connecting the customer to B takes up a port at B for a month. Assume that before the customer is connected to B, the demand forecast for B for a month is 10 and its capacity is 8. Thus, potentially, two orders may have to be back-hauled to an alternate node of B. Once the customer is connected to B (i.e. spillover from A), the demand forecast for B is 11. The probability of spillover of the alternate node to its alternate node (i.e. the alternate node of B) when the customer is connected to the alternate node is calculated by the following formula: (demand forecast at B after demand at A is redirected to B—actual capacity at the alternate node) divided by (demand forecast at B before demand at A is redirected to B). Then the cost of spillover of B to its alternate node when the demand from A is redirected to B is calculated by the following formula: (probability of spillover)×{(distance between B and its alternate node)×(cost per mile)}. In the present example the calculation is as follows: $(3/10) \times$ {distance between the alternate node and its nearest alternate)×(cost per mile)}.

The sum of the "first access cost" and the "second access cost" is the total access cost for each of the plurality of nearby alternative nodes. The optimal alternate node is the node which has one of the lowest "total access costs." Preferably, the optimal alternate node is the node whose "total access cost" is within the bottom ten percent in value, more preferably is within the bottom five percent in value, and most preferably with the lowest "total access cost." A component can be added to the above described system to perform this selection of the optimal alternative node, i.e. the alternate node component. The first customer can be redirected to the optimal alternate node.

Each node in the network can be evaluated for suitability as the optimal alternate node. Preferably, the number of nodes that are evaluated is limited to a configurable number in a systematic manner. For example, the alternate nodes for each planned node can be ranked according to their distance from the planned node; and then the nearest nodes are evaluated first. Such a ranking of the alternate nodes for each planned node can be stored in a database.

After a customer has been re-directed to an alternate node, the capacity of the planned node of the customer may increase to the point that the planned node may once again be able to accommodate the customer. The capacity of the planned node can be increased by the addition of one or more ports of the desired type to the planned node.

In one embodiment of the invention, a method is provided for determining whether it is cost effective to add ports to a node in order to re-home a customer. In this method, the "cost of re-home" is provided, or calculated. For example, the "cost of re-home" can be provided by a user. The "cost of re-home" includes the cost of building a new circuit, additional testing and turn-up costs and disconnecting the first circuit. Also, the "cost of re-home" includes the addition of new ports to the planned node. Re-homing is cost effective only if the capacity at the planned node is at least one port greater than the forecasted demand at the planned node.

In this method, the "total access cost" for redirecting the demand of a planned node to an alternate node, as defined above, is compared with the "cost of re-homing" the demand to the planned node. The difference between the "cost of re-home" and the "total access cost" is calculated. In order to simplify the discussion in this specification, the difference is illustrated as the subtraction of the "total access cost" from the "cost of re-home." A skilled artisan would know how to adjust the methods of the invention wherein the difference is calculated as the subtraction of the "cost of re-home" from the "total access cost."

The difference between the "cost of re-home" and the "total access cost" determines whether a re-home alert is generated. That is, a re-home alert is generated if the difference between these two parameters is deemed to be at a value which indicates that it is cost effective to add ports to the planned node. The re-home is forwarded to a user, as described above, who may reconfigure the network topology to effect the re-home.

In particular, the difference between the "cost of re-home" and the "total access cost" is compared to a re-home threshold value. The re-home threshold value is a monetary value, or a function of a such a value. The re-home threshold value is set by a user. For example, if the user values re-homing despite a relatively high cost, then the threshold value could be set at a relatively high value. That is, a greater difference between the "cost of re-home" and the "total access cost" is tolerated. For example, the re-home threshold value can be set so that a re-home alert is sent if the difference is greater than a relatively high monetary value. On the other hand, if the user is cost conscious, then the threshold value could be set at a relatively low value. That is, a re-home alert to activate re-home is only sent if re-homing would be a relatively inexpensive exercise.

The threshold value can be set by a user. As described above for the evaluation of the threshold for a forecast change, the re-home threshold value can specify an upper bound, or specify a lower bound.

A component can be added to the above described system to perform this method of determining if re-homing is cost effective, i.e. the re-home component. As described for determining a forecast change, a re-home alert passes through the alert distributor and reaches the recipient according to his preferences.

The present invention includes a computer program product, which is a storage medium including instructions that can be used to program a computer to perform the methods of the invention. The storage medium can include, but is not limited to, any type of disk including floppy disks, optical discs, Compact Disk Read Only Memory (CD-ROMs), and magnetic disks, Read-Only Memory (ROMs), Random-Access Memory (RAMs), Electrically Programmable Read-Only Memory (EPROMs), Electrically Eraseable Programmable Read-Only Memory (EEPROMs), magnetic or optical cards, or any type of media suitable for storing electronic instructions.

Stored on any one of the above described storage media (computer readable media) the present invention includes programming for controlling both the hardware of the computer and for enabling the computer to interact with a human user. Such programming may include, but is not limited to, software for implementation of device drivers, operating systems, and user applications. Such computer readable media further includes programming or software instructions to direct the general purpose computer to perform tasks in accordance with the present invention. Appropriate software coding can readily be prepared by skilled programmers based on the teachings of the present disclosure, as will be apparent to those skilled in the software art.

The invention can be implemented by combining the methods and systems into any kind of platform. For example, the platform can be an Intel 80486 processor running DOS Version 6.0. The platform could also be UNIX machines on an Ethernet network. Alternatively, the methods and systems can be implemented by a continuous forecasting system in which the results are put into a database instead of emailing or calling the user.

Additionally, the present invention can be implemented using a conventional general purpose digital computer or microprocessor programmed according to the teachings of the present specification, as will be apparent to those skilled in the computer art.

The invention may also be implemented by the preparation of application specific units, such as integrated circuits (ASIC) or by interconnecting an appropriate network of conventional circuit components, as will be readily apparent to those skilled in the art.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

The invention claimed is:

1. A system for avoiding demand forecast errors in a network topology model wherein the system monitors and controls quantity of a particular type of port at a node, the system comprising:
   a memory;
   (a) a user interface, wherein the system is configured via the user interface wherein a configuration comprises:
      (i) setting a forecast period for ports at the node, wherein the forecast period is a function of the time required to change the quantity of a particular type of port at the node, and
      (ii) setting a threshold value to generate alerts, wherein the threshold value is a function of the forecast period;
   (b) an analytical module, wherein the analytical module monitors the node for a change in demand forecasted for the particular type of port;
   (c) an alert engine, wherein the alert engine is activated by the analytical module if the analytical module detects a change in demand forecasted, wherein when the alert engine is alerted the alert engine computes difference between the demand forecasted and actual quantity of ports at the node, wherein upon detecting the difference is greater than the threshold value, the alert engine generates an alert, wherein the change in the demand forecasted is the addition or deletion of customer assignments at the node, or a change in quantity of the ports at the node, or a combination of both;
   (d) an alert distributor, which receives the alert, wherein the alert distributor associates the alert with recipient information, and forwards the alert and recipient information to a user; and
   (e) an alternate node component, wherein the alternate node component determines an optimal alternate node for a customer premise, wherein a planned node does not meet demand for a desired type of port, and wherein the optimal alternate node has excess capacity for the desired type of port;
   wherein the optimal alternate node is determined by a method comprising:
      (i) assigning a "first access cost" to each of a plurality of alternate nodes that are nearby the customer premise, wherein the "first access cost" is a function of the distance between the customer premise and the alternate node;
      (ii) assigning a "second access cost" to each of the plurality of alternate nodes, wherein the "second access cost" is a function of the probability that the alternate node would not be able to accommodate demand from the customer premise; and
      (iii) for each alternate node, calculating a "total access cost," wherein the "total access cost" is the sum of the "first access cost" and the "second access cost," wherein the optimal node is the node which has one of the lowest "total access costs".

2. The system according to claim 1 wherein the change in the demand forecasted is the addition or deletion of customer assignments at the node, or a change in quantity of the ports at the node or a combination of both.

3. The system according to claim 1 wherein the alert comprises the identification of the node, type of the port, actual quantity of ports at the node, demand forecasted at the node, or combinations thereof.

4. The system according to claim 1 wherein the network topology model is an internet protocol backbone network.

5. A system according to claim 1 further comprising a re-home component, wherein the re-home component determines if re-homing is cost effective.

6. A method for avoiding demand forecast errors in a network topology model, having a plurality of nodes, by monitoring and controlling quantity of a particular type of port at a node, the method comprising:
   (a) providing a system that comprises an user interface, an analytic module, an alert engine, an alert distributor, a contact manager, information of the actual quantity of a particular type of port at a node, and information of the demand forecast of the quantity of the type of port at the node;
   (b) configuring the system via the user interface comprising
      (i) setting a forecast period for the particular type of port at the node, wherein the forecast period is a function of the time required to change the quantity of the ports at the node, and
      (ii) setting a threshold value to generate alerts, wherein the threshold value is a function of the forecast period;
   (c) monitoring the node via the analytical module for a change in demand forecast for the type of port, wherein if a change in the demand forecast is detected then updating the demand forecast and go to step (d);
   (d) activating the alert engine wherein the alert engine computes the difference between the updated demand forecast and actual quantity of the type of port at the node, wherein upon detecting the difference is greater than the threshold value, generating an alert and go to step (e);
   (e) passing the alert to an alert distributor, wherein the alert distributor associates the alert with recipient information;
   (f) forwarding the alert and the recipient information to a contact manager, wherein the network topology model can be reconfigured to avoid demand forecast errors; and
   (g) determining an optimal alternate node for a customer premise, wherein a planned node does not meet the demand for a desired type of port, and wherein the optimal alternate node has excess capacity for the desired type of port, by a method comprising:
      (i) assigning a "first access cost" to each of a plurality of alternate nodes that are nearby the customer premise, wherein the "first access cost" is a function of the distance between the customer premise and the alternate node;

(ii) assigning a "second access cost" to each of the plurality of alternate nodes, wherein the "second access cost" is a function of the probability that the alternate node would not be able to accommodate demand from the customer premise; and (iii) for each alternate node, calculating the "total access cost," wherein the "total access cost" is the sum of the "first access cost" and the "second access cost," wherein the optimal node is the node which has one of the lowest "total access costs".

7. The method according to claim 6 wherein the change in the demand forecast is the addition or deletion of customer assignments at a node, or a change in quantity of the ports at the node, or a combination of both.

8. An article of manufacture for avoiding demand forecast errors in a network topology model by monitoring and controlling quantity of a selected type of port at a node, the article comprising:

a machine readable storage medium, and a memory, containing one or more programs which when executed implement the steps of:

(a) setting of a threshold value to generate alerts, wherein the threshold value is a function of a forecast period, wherein a capacity at a node for a selected type of port is provided, and wherein a demand forecast of the type of port at the node for a forecast period is provided, and wherein the forecast period is a function of the time required to change the capacity at the node;

(b) monitoring a node for a change in a demand forecast, wherein if a change is detected then (i) updating the demand forecast, and (ii) computing the difference between the updated demand forecast and the capacity of the node, wherein if the difference is greater than a threshold value, then generating an alert, wherein the network topology model can be reconfigured to avoid demand forecast errors; and (c) determining if re-homing a customer is cost effective, wherein customer demand was redirected from a planned node to an alternate node, comprising:

(i) assigning a "cost of re-home," wherein the "cost of re-home" comprises cost of directing the customer demand to the planned node and cost of adding of new ports to the planned node;

(ii) providing a "total access cost," wherein the "total access cost" is the sum of: a "first access cost," wherein the "first access cost" is a function of the distance between the customer and the alternate node, and a second access cost, wherein the "second access cost" is a function of the probability that the alternate node would not be able to accommodate demand from the customer; and (iii) comparing the difference between the "cost of re-home" and the "total access cost" to a re-home threshold value, wherein the re-home threshold value is a monetary value, or a function of a such a value, and wherein an alert is generated if the comparison indicates that it is cost effective to re-home the customer.

9. An article of manufacture according to claim 8 for further determining an optimal alternate node for a customer premise, wherein a planned node does not meet demand for a desired type of port, and wherein the optimal alternate node has excess capacity for the desired type of port, the article further comprising:

a machine readable storage medium, and a memory, containing one or more programs which when executed implement the steps of:

(a) assigning a "first access cost" to each of a plurality of alternate nodes that are nearby the customer, wherein the "first access cost" is a function of the distance between the customer and the alternate node;

(b) assigning a "second access cost" to each of the plurality of alternate nodes, wherein the "second access cost" is a function of the probability that the alternate node would not be able to accommodate demand from the customer; and (c) for each alternate node, calculating "total access cost," wherein the "total access cost" is the sum of the "first access cost" and the "second access cost," wherein the optimal node is the node which has one of the lowest "total access costs".

* * * * *